United States Patent
Böhm (10) Patent No.: US 9,415,707 B2
(45) Date of Patent: Aug. 16, 2016

(54) CHILD SAFETY SEAT

(71) Applicant: Britax Römer Kindersicherheit GmbH, Ulm (DE)

(72) Inventor: Martin Böhm, Blaustein (DE)

(73) Assignee: BRITAX RÖMER KINDERSICHERHEIT GMBH, Ulm (DE)

( * ) Notice: Subject to any disclaimer, the term of this patent is extended or adjusted under 35 U.S.C. 154(b) by 0 days.

(21) Appl. No.: 14/618,242

(22) Filed: Feb. 10, 2015

(65) Prior Publication Data

US 2015/0246629 A1    Sep. 3, 2015

(30) Foreign Application Priority Data

Feb. 28, 2014   (EP) .................................... 14000726
May 16, 2014   (EP) .................................... 14001741

(51) Int. Cl.
*B60N 2/28*   (2006.01)
*B60N 2/48*   (2006.01)

(52) U.S. Cl.
CPC ............ *B60N 2/2851* (2013.01); *B60N 2/4814* (2013.01); *B60N 2/4817* (2013.01)

(58) Field of Classification Search
CPC ...... B60N 2/4817; B60N 2/4814; B60N 2/48; B60N 2/28; B60N 2/2839; B60N 2/2851
USPC .............................................. 297/410, 250.1
See application file for complete search history.

(56) References Cited

U.S. PATENT DOCUMENTS

| | | |
|---|---|---|
| 2003/0151282 A1* | 8/2003 | Williams et al. ............ 297/250.1 |
| 2010/0264705 A1 | 10/2010 | Karremans et al. |
| 2012/0153690 A1 | 6/2012 | Gaudreau, Jr. |
| 2012/0242127 A1 | 9/2012 | Gaudreau, Jr. |
| 2012/0313413 A1* | 12/2012 | Hutchinson et al. ....... 297/250.1 |
| 2013/0320725 A1 | 12/2013 | Conway |
| 2014/0049081 A1 | 2/2014 | Davis et al. |

FOREIGN PATENT DOCUMENTS

| | | |
|---|---|---|
| CN | 202753817 U | 2/2013 |
| GB | 2491708 A | 12/2012 |
| WO | 2007035386 A1 | 3/2007 |

OTHER PUBLICATIONS

Extended Search Report and Written Opinion of related application No. EP 14001741.9 mailed Jun. 24, 2015, all enclosed pages cited.

* cited by examiner

*Primary Examiner* — Milton Nelson, Jr.
(74) *Attorney, Agent, or Firm* — Nelson Mullins Riley & Scarborough LLP (57) ABSTRACT

An adjusting mechanism for a height adjustable headrest of a child safety seat includes an actuator and a locking device. The child safety seat includes a seat shell and a headrest. The headrest is slidably mounted to the seat shell for up-and-down movement. The locking device is configured to releasably lock the headrest at a selected height. The actuator is configured to allow the locking device to be released by actuation of the actuator, thus allowing the height of the headrest to be adjusted. The actuator is positioned between the headrest and the seat shell and is configured to project above the headrest. The locking device includes a first component mounted to the seat shell and a second component mounted to the headrest. The second component is configured to releasably engage with the first component.

6 Claims, 7 Drawing Sheets

CHILD SAFETY SEAT

CROSS-REFERENCE TO RELATED APPLICATIONS

This application is a U.S. application claiming priority to EP 14000726.1 filed Feb. 28, 2014 and EP 14001741.9 filed May 16, 2014, the entire contents of each of which are hereby incorporated herein by reference.

BACKGROUND

The present invention relates to an adjusting mechanism for a height adjustable headrest of a child safety seat and to a child safety seat comprising such an adjusting mechanism.

Child safety seats are employed for the safe transport of children in vehicles. Many of these child safety seats comprise a headrest which is intended to protect the child's head. To achieve a high level of protection it is important that the headrest is suitably positioned in the child safety seat with respect to the child's head. Since a child safety seat is usually used over a period of several months or years, during which period a child will experience significant growth, it has become common practice to provide a child safety seat with a height adjustable headrest. In such a child safety seat the height of the headrest can be adjusted to the needs of a specific child.

Since the headrest of a child safety seat has a significant influence on the level of protection the child safety seat is able to provide, it is obvious that there is a need for a reliable and easily operated adjusting mechanism for the headrest of a child safety seat. Parents and other caregivers may be reluctant to constantly adjust the headrest to the proper height if the mechanism is complicated to operate or if there could be doubts as to whether the headrest has been properly secured in the new position.

BRIEF SUMMARY

Therefore, it is an object of the present invention to provide a reliable adjusting mechanism for a height adjustable headrest of a child safety seat which is easily operated.

The present invention is directed to an adjusting mechanism for a height adjustable headrest of a child safety seat, the child safety seat comprising a seat shell and a headrest, wherein the headrest is slidably mounted to the seat shell for up-and-down movement. The adjusting mechanism in accordance with the invention comprises an actuator and a locking device, wherein the locking device is configured to releasably lock the headrest at a selected height, wherein the actuator is configured to allow the locking device to be released by actuation of the actuator, thus allowing the height of the headrest to be adjusted, and wherein the actuator is positioned between the headrest and the seat shell and is configured to project above the headrest.

When the locking device is locked, the headrest is fixed at a specific height or position. In order to adjust the height of the headrest, i.e. to slide the headrest to another position, the locking device has to be unlocked. This can be achieved by actuating the actuator. As soon as the locking device is released or unlocked, the headrest can be repositioned. By positioning the actuator between the headrest and the seat shell and by having the actuator project above the headrest it can be ensured that the actuator is always easily accessible. Since the actuator is positioned between the headrest and the seat shell, the actuator is positioned in front of the seat shell, not behind the seat shell. Therefore, with this actuator, there is no need to reach to the back of the child safety seat (as with actuators that are positioned on the back of the backrest of the child safety seat) in order to adjust the headrest. Furthermore, since the actuator projects above the headrest, there is no need to have access to the possibly narrow space between headrest and seat shell in order to reach the actuator. As a result, the adjusting mechanism is operable from the front of the child safety seat and is operable with one hand.

Advantageously, the locking device comprises a first component mounted to the seat shell and a second component mounted to the headrest, wherein the second component is configured to releasably engage with the first component. With these two components, one being mounted to the seat shell, the other one being mounted to the headrest, the headrest's position relative to the seat shell can be reliably locked. Since the second component is configured to releasably engage with the first component, the headrest's position will not be permanently locked. Instead, the locking can be released by disengaging the second component from the first component.

Instead of being mounted to the seat shell, the first component may be formed integrally with the seat shell. This might reduce manufacturing costs of a child safety seat comprising an adjusting mechanism in accordance with the invention.

Preferably, the first component comprises a toothed rack and the second component comprises a locking lever and an axle, wherein the locking lever is pivotally mounted to the headrest and the axle is adapted to be disengaged from the toothed rack by pivoting of the locking lever in order to unlock the locking device. When the axle engages with the toothed rack, the locking device is locked. The locking device can be unlocked by pivoting the locking lever so that the axle is disengaged from the toothed rack. By making use of a toothed rack a number of locking positions can be defined for the headrest. Each recess positioned between two adjacent teeth of the toothed rack corresponds to one possible position of the headrest. The headrest is locked in a specific position by inserting the axle in the recess of the toothed rack corresponding to this specific position. By adjusting the configuration of the toothed rack (e.g., number of teeth/recesses, size of teeth/distance between adjacent recesses) the possible positions of the headrest can be configured.

Advantageously, the actuator is coupled to the locking lever such that by pushing the actuator downwards the locking lever is configured to pivot in order to disengage the axle from the toothed rack. Thus, by pushing the actuator downwards, the locking device can be released. As soon as the locking device is released, the headrest can be repositioned. To lower the headrest, it is sufficient to continue pushing the actuator downwards. Therefore, with this configuration of the adjusting mechanism of the invention, lowering the headrest of the child safety seat is a very straightforward and intuitive process: pushing the actuator downwards is all one needs to do in order to lower the headrest.

Advantageously, the teeth of the toothed rack are shaped to allow the axle to automatically snap from one position to another position when the actuator or the headrest is being pulled upwards. To give the teeth of the toothed rack such a shape is advantageous since with this shape of the teeth, in order to raise the headrest, it will not be necessary to release the locking device by pushing the actuator downwards. Instead, the locking device will be automatically released as the headrest or the actuator is being pulled upwards. Thus, raising the headrest of the child safety seat will also be intuitive: the headrest can be raised simply by pulling the actuator or the headrest upwards. There is no need to separately release or unlock the locking device.

Advantageously, the adjusting mechanism of the invention furthermore comprises a biasing member configured to bias the axle into engagement with the toothed rack. With this biasing member it can be ensured that in the rest configuration of the adjusting mechanism, i.e. without actuation of the actuator, the locking device is locked. In the rest configuration the axle is held in engagement with the toothed rack by the biasing member. To disengage the axle from the toothed rack, i.e. to unlock the locking device, the biasing force exerted on the axle by the biasing member has to be overcome.

Advantageously, the toothed rack is shaped so that the axle is prevented from being forced out of a recess positioned between two adjacent teeth of the toothed rack by pushing the headrest downwards, whereas the axle is free to slide out of the recess when the headrest is being pulled upwards. This ensures that in order to lower the headrest, the actuator has to be actuated so that the locking device gets released, i.e. the axle is disengaged from the toothed rack, whereas in order to raise the headrest, there is no need to release the locking device by actuating the actuator. Instead, the locking device will be automatically released as the headrest is being raised. Thus, the headrest may be lowered or raised in a very convenient way.

According to another aspect of the invention, there is provided a child safety seat comprising the adjusting mechanism described above.

Advantageously, the child safety seat furthermore comprises an internal harness system comprising shoulder straps, wherein the shoulder straps are routed over the axle. By routing the shoulder straps over the axle, forces acting on the shoulder straps during a crash of the vehicle carrying the child safety seat can be employed to further secure the position of the headrest of the child safety seat. The shoulder straps can be made to press the axle to the toothed rack, thus preventing the axle from disengaging from the toothed rack.

Overall, the adjusting mechanism of the invention is designed to allow the mechanism to be operable from the front of the child safety seat, to be operable with one hand, to be intuitive for a user, and to be running smoothly.

According to another aspect of the invention an adjusting mechanism for a height adjustable headrest of a child safety seat is provided, the child safety seat comprising a seat shell, a headrest, an actuator, and a locking device, wherein the headrest is slidably mounted to the seat shell for up-and-down movement, the locking device is configured to releasably lock the headrest at a selected height, and the actuator is configured to allow the locking device to be released by actuation of the actuator, thus allowing the height of the headrest to be adjusted.

According to another aspect of the invention an adjusting mechanism for a height adjustable headrest of a child safety seat is provided, the child safety seat comprising a seat shell and a headrest, wherein the headrest is slidably mounted to the seat shell for up-and-down movement, the adjusting mechanism comprising an actuator and a locking device, wherein the locking device is configured to releasably lock the headrest at a selected height, and wherein the actuator is configured to allow the locking device to be released by actuation of the actuator, thus allowing the height of the headrest to be adjusted, wherein the locking device comprises a locking lever which is pivotally mounted to the headrest and an axle which is connected to the locking lever, wherein the locking device furthermore comprises a toothed rack which is mounted to the seat shell and wherein the axle is configured to releasably engage with the toothed rack in order to releasably lock the headrest, wherein the axle is adapted to be disengaged from the toothed rack by pivoting of the locking lever in response to a downward force acting on the actuator in order to unlock the locking device.

BRIEF DESCRIPTION OF THE DRAWINGS

Specific embodiments of the invention will now be described by way of example and with reference to the accompanying drawings, in which.

DETAILED DESCRIPTION

Figure 1:
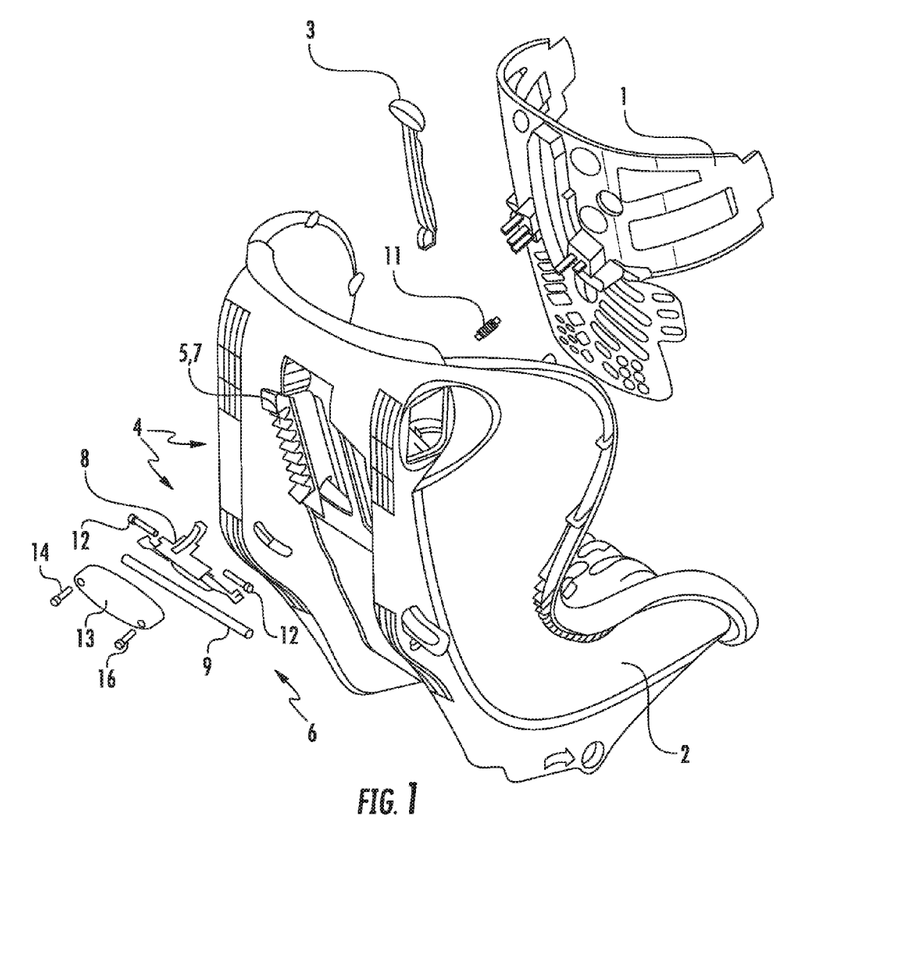
FIG. 1 is an exploded view of a child safety seat comprising an adjusting mechanism for a height adjustable headrest in accordance with an embodiment of the invention.

FIG. 1 shows a child safety seat comprising an adjusting mechanism for a height adjustable headrest 1 in accordance with an embodiment of the invention. The child safety seat comprises a seat shell 2, a height adjustable headrest 1, an actuator 3, and a locking device 4. The headrest 1 is slidably mounted to the seat shell 2 for up-and-down movement. The seat shell 2 comprises a backrest portion and a seating portion. The headrest 1 is coupled to the backrest portion of the seat shell 2. The adjusting mechanism furthermore comprises a locking device 4. The locking device 4 is configured to releasably lock the position of the headrest 1.

The locking device 4 comprises a first component 5 and a second component 6. In the embodiment of the invention shown in FIG. 1 the first component 5 comprises a toothed rack 7 which is fixedly mounted to the back of the backrest portion of the seat shell 2. In an alternative embodiment of the invention, the toothed rack 7 is integrally formed with the seat shell 2. The second component 6 of the locking device 4 comprises a locking lever 8 and an axle 9. The locking lever 8 is pivotally mounted to the headrest 1 by two pins 12 and is configured to pivot about the pivot axis defined by the pins 12. The axle 9 is fixedly mounted to the locking lever 8 and is adapted to engage with the toothed rack 7 in order to lock the headrest 1 in a selected position. To unlock the headrest 1, the axle 9 is disengaged from the toothed rack 7. This is achieved by pivoting the locking lever 8 about the pivot axis.

The adjusting mechanism shown in FIG. 1 furthermore comprises a biasing member in the form of a spring 11. This spring 11 is coupled to the locking lever 8 and to the headrest 1. The spring 11 forces the axle 9 into engagement with the toothed rack 7 as will become more apparent in subsequent Figures. The adjusting mechanism furthermore comprises an actuator 3 which is positioned between the headrest 1 and the seat shell 2 and which is configured to project above the headrest 1. The actuator 3 is configured to allow the locking device 4 to be released by actuation of the actuator 3.

The adjusting mechanism furthermore comprises a cover 13 which is configured to partly cover the locking lever 8 and which is mounted to the headrest 1 by two screws 14. Furthermore, the cover 13 is configured to prevent the headrest 1 from being detached from the child safety seat.

Figure 2:
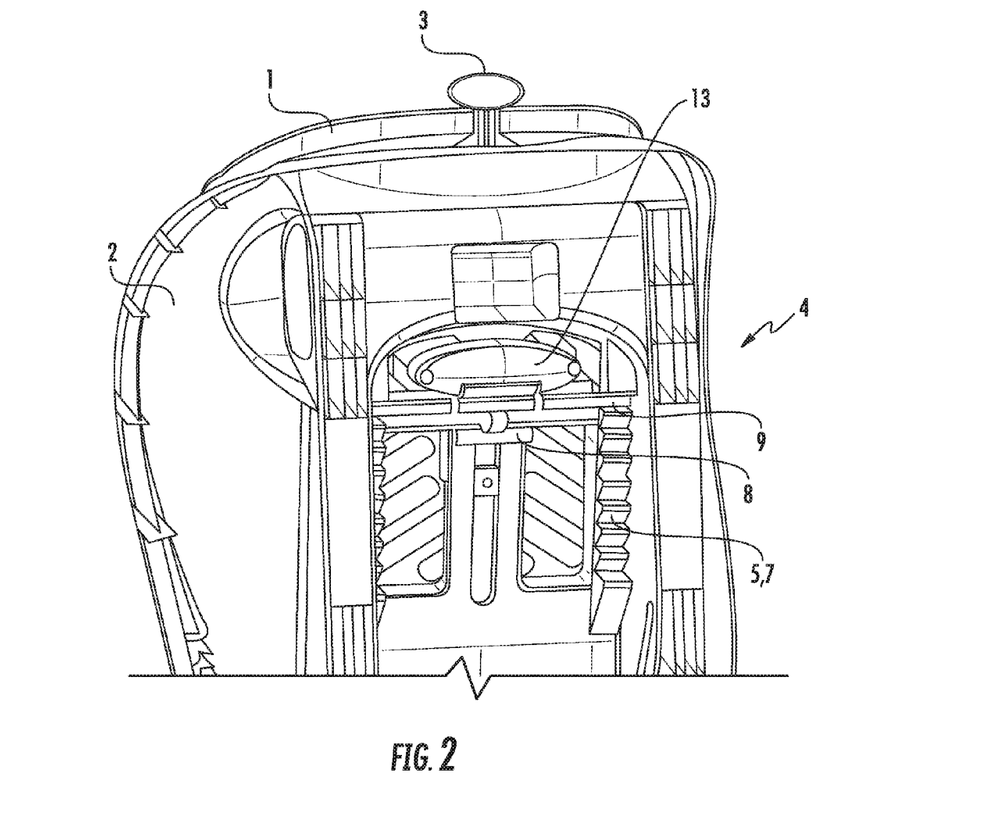
FIG. 2 is a rear view of the child safety seat of FIG. 1.

FIG. 2 shows a rear view of the child safety seat of FIG. 1. In this view the axle 9 engages with the toothed rack 7, thus locking the headrest 1 in the uppermost position. As can be clearly seen in this view, the actuator 3 is configured to project above the headrest 1. Therefore, the actuator can be easily reached by a user of the child safety seat, even from the front of the seat.

The process of lowering the headrest 1 with the adjusting mechanism of the invention is shown in FIGS. 3a-d.

Figure 3A:
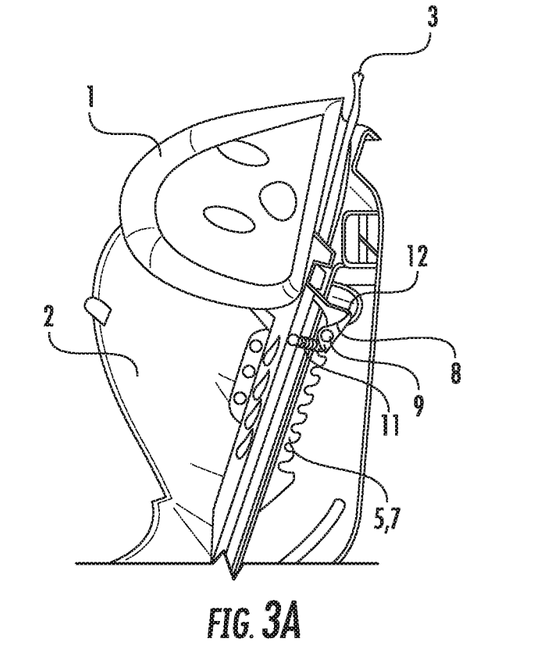
FIG. 3a is a sectional view of the child safety seat of FIG. 1, with the height adjustable headrest locked in the uppermost position.

FIG. 3a is a sectional view of the child safety seat of FIGS. 1 and 2. The height adjustable headrest 1 is locked in the uppermost position. Again, the actuator 3 can be seen to project above the headrest 1. The tension spring 11 is coupled to the locking lever 8 and to the headrest 1 and is configured to generate a torque to pivot the locking lever 8 about the pivot axis defined by the pins 12 in the clockwise direction. Since the axle 9 is coupled to the locking lever 8 below the pins 12, this torque forces the axle 9 into engagement with the toothed rack 7. To release the locking device 4 of the adjusting mechanism in accordance with the invention, the actuator 3 is pushed downwards.

Figure 3B:
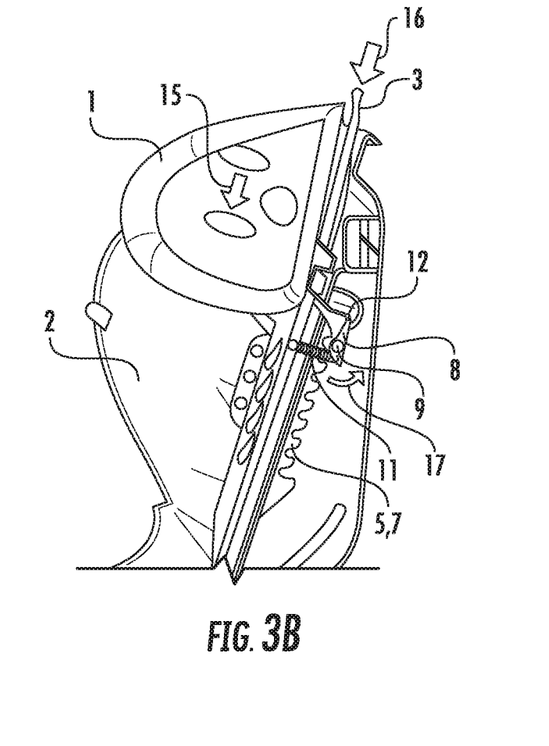
FIG. 3b is a sectional view similar to FIG. 3a, with the height adjustable headrest unlocked for adjustment of its height.

This is shown in FIG. 3b. Here, the actuator 3 has been pushed downwards in the direction indicated by arrow 16. When the actuator 3 is pushed downwards, it generates another torque on the locking lever 8 which counteracts the torque generated by the spring 11. If the torque generated by the actuator 3 exceeds the torque generated by the spring 11, the locking lever 8 will be pivoted about the pivot axis defined by the pins 12 in the counter-clockwise direction, thus removing the axle 9 from the toothed rack 7 in the direction indicated by arrow 17. As soon as the axle 9 is disengaged from the toothed rack 7, the headrest 1 is free to move downwards in the direction indicated by arrow 15. Therefore, pushing the actuator 3 down will first release the locking device 4 and will then push the headrest 1 down to a lower position.

Figure 3C:
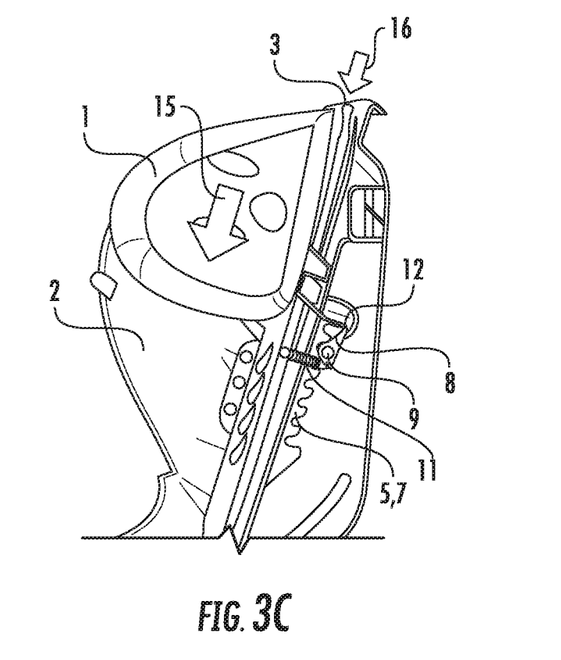
FIG. 3c is a sectional view similar to FIG. 3b, with the height adjustable headrest pushed to a lower position.

In FIG. 3c the headrest 1 has reached the lower position. The axle 9 is still disengaged from the toothed rack 7. Therefore, if the downward force 16 on the actuator 3 would continue to be applied, the headrest 1 would continue to be lowered in the direction indicated by arrow 15. To lock the headrest 1 in the lowered position, the actuator 3 has to be released. When the actuator 3 is released, the actuator 3 will no longer generate a torque on the locking lever 8. Therefore, the spring 11 will again bring the axle 9 into engagement with the toothed rack 7, now locking the headrest in the lowered position.

Figure 3D:
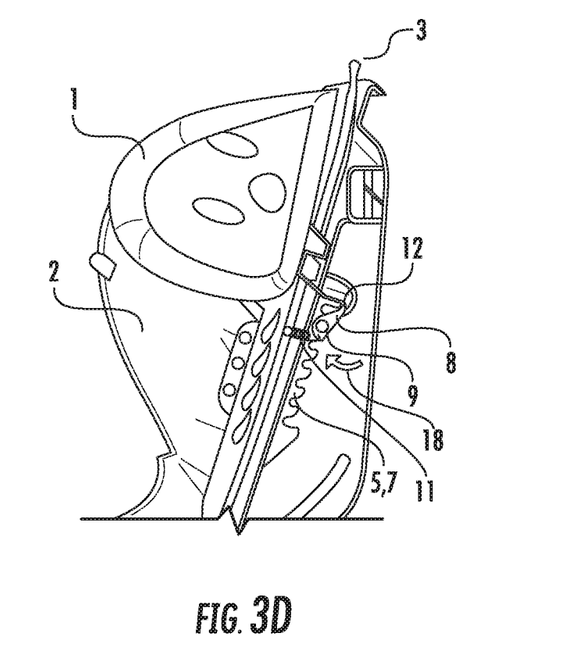
FIG. 3d is a sectional view similar to FIG. 3c, with the height adjustable headrest locked in a lower position.

This is shown in FIG. 3d where the locking lever 8 has been pivoted about the pins 12 in the direction indicated by arrow 18. This clockwise rotation of the locking lever 8 brings the axle 9 back into engagement with the toothed rack 7 and pushes the actuator 3 upwards so that the actuator 3 again projects above the headrest 1.

The process of raising the headrest 1 with the adjusting mechanism of the invention is shown in FIGS. 4a-d.

Figure 4A:
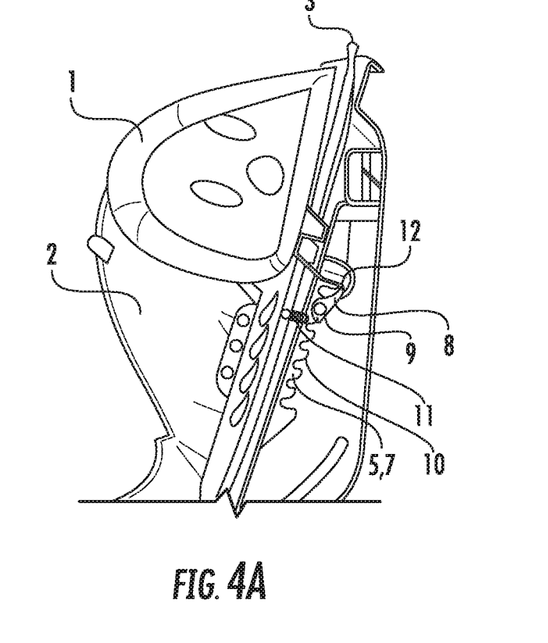
FIG. 4a is a sectional view similar to FIG. 3d, with the height adjustable headrest locked in a lower position.

FIG. 4a shows the headrest 1 locked in the lowered position of FIG. 3d. To raise the headrest 1, the actuator 3 can be pulled upwards in the direction indicated by arrow 20 in FIG. 4b, or the headrest 1 itself can be pulled upwards in the direction indicated by arrow 19 in FIG. 4b. The actuator 3 is coupled to the headrest 1 in such a way that by pulling the actuator 3 upwards, the actuator 3 loses contact with the locking lever 8. When the headrest 1 is pulled upwards, the locking lever 8 which is coupled to the headrest 1 will also be pulled upwards. The teeth 10 of the toothed rack 7 are shaped such that when the locking lever 8 is pulled upwards, the axle 9 is pushed out of the recess between two teeth by sliding on the edge of the tooth positioned above the axle 9.

Figure 4B:
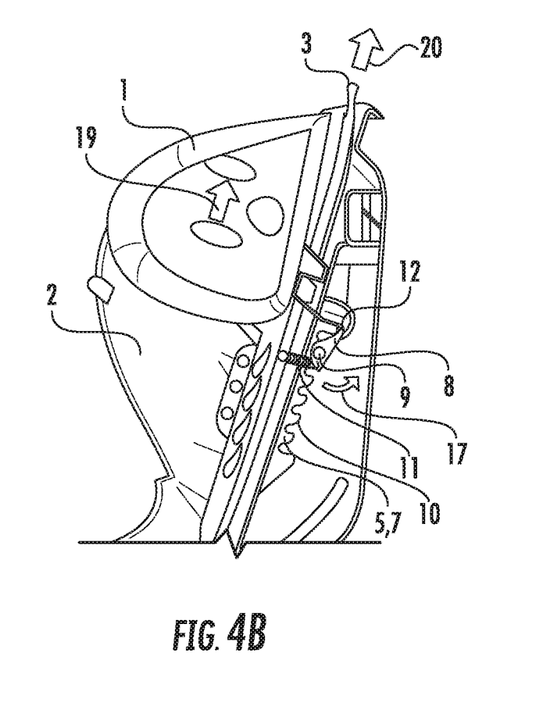
FIG. 4b is a sectional view similar to FIG. 4a, with the height adjustable headrest slightly raised from the position of FIG. 4a, thereby unlocking a locking device.

This is shown in FIG. 4b. Actuator 3 is pulled upwards in the direction indicated by arrow 20, thus raising the headrest 1 in the direction indicated by arrow 19. By this, locking lever 8 is also raised. Thus, axle 9 slides on the edge of the tooth positioned above axle 9. As a result, the locking lever 8 begins to pivot about the pivot axis defined by the pins 12 in the direction indicated by arrow 17, against the force of the tension spring 11.

Figure 4C:
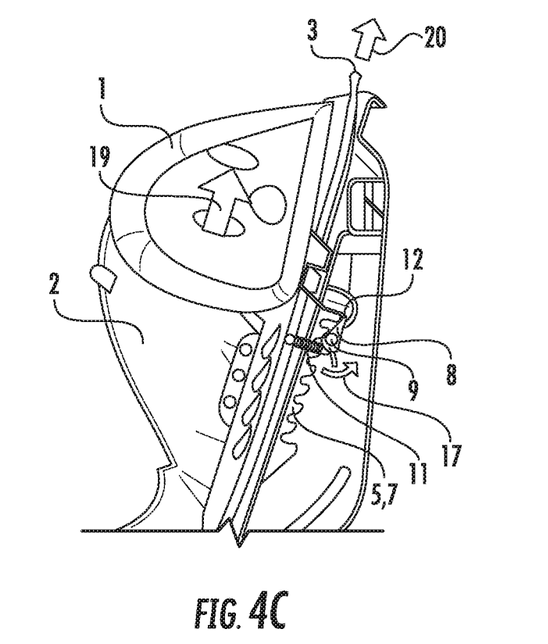
FIG. 4c is a sectional view similar to FIG. 4b, with the height adjustable headrest raised higher, the locking device still unlocked.

When the headrest 1 is raised further in the direction indicated by arrow 19, as shown in FIG. 4c, the locking lever 8 continues to pivot about the pins 12 in the direction indicated by arrow 17 until the axle 9 has reached the top of a tooth of the toothed rack 7. When the headrest 1 is then still raised further, the axle 9 will snap into the next recess positioned between two teeth of the toothed rack 7, thus locking the headrest in a raised position.

Figure 4D:
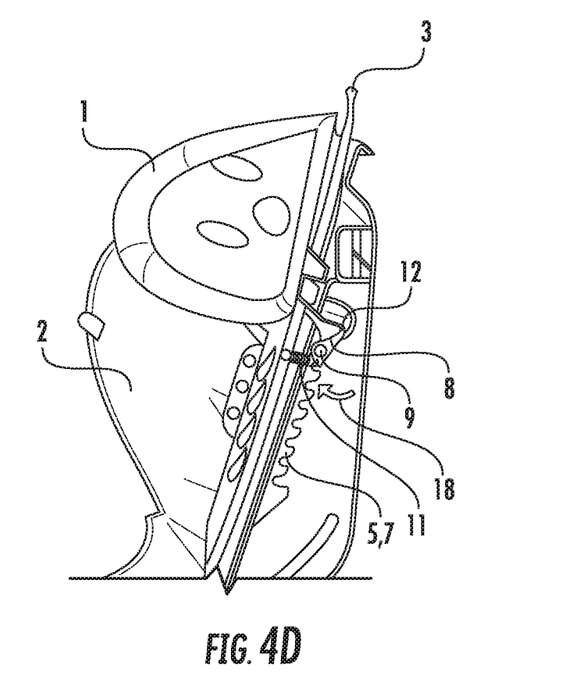
FIG. 4d is a sectional view similar to FIG. 4c, with the height adjustable headrest locked again in the uppermost position.

This is shown in FIG. 4d. The locking lever 8 is pivoted about the pins 12 by the tension spring 11 so that the axle 9 is brought into engagement with the toothed rack 7. The headrest 1 is locked again.

Figure 5A:
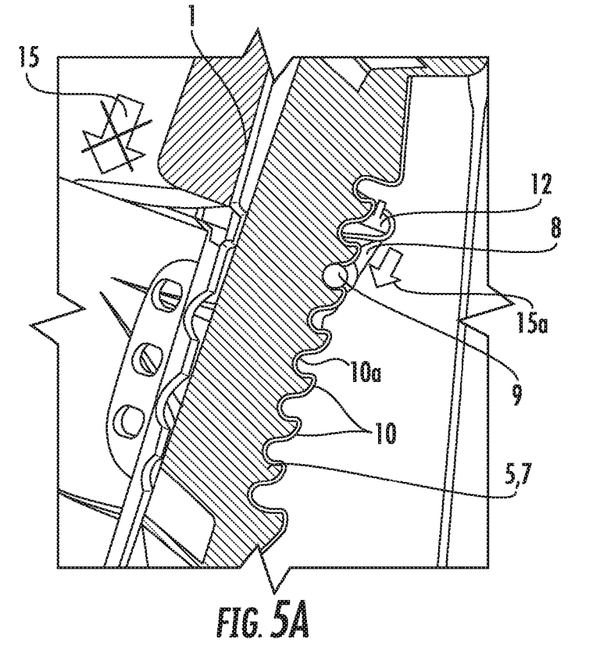
FIG. 5a is a detailed view of the adjusting mechanism of the previous Figures.

FIG. 5a shows the toothed rack 7 of an adjusting mechanism in accordance with the invention in more detail. The toothed rack 7 comprises a plurality of teeth 10. Each pair of adjacent teeth 10 defines a recess 10a positioned between these teeth 10. The recesses 10a are configured to receive the axle 9. The locking lever 8 is configured to pivot about the pivot axis defined by the pins 12. In the configuration shown in FIG. 5a the headrest 1 is locked since the axle 9 engages with the toothed rack 7. In particular, the axle 9 is positioned in a recess 10a. The headrest 1 cannot be lowered simply by pushing the headrest 1 downwards in the direction indicated by arrow 15. When the headrest 1 is pushed downwards in the direction indicated by arrow 15, a force will be exerted on the axle 9 acting in the direction indicated by arrow 15a. This is due to the fact that the axle 9 is positioned in front of the pins 12. In other words, the pivot axis defined by the pins 12 is placed behind the toothed rack 7. Due to the specific shape of the teeth 10 of the toothed rack 7, the force acting on the axle 9 in the direction of arrow 15a locks the axle 9 in the recess 10a. Thus, the headrest 1 cannot be lowered without releasing the locking device 4 first by actuation of the actuator 3.

Figure 5B:
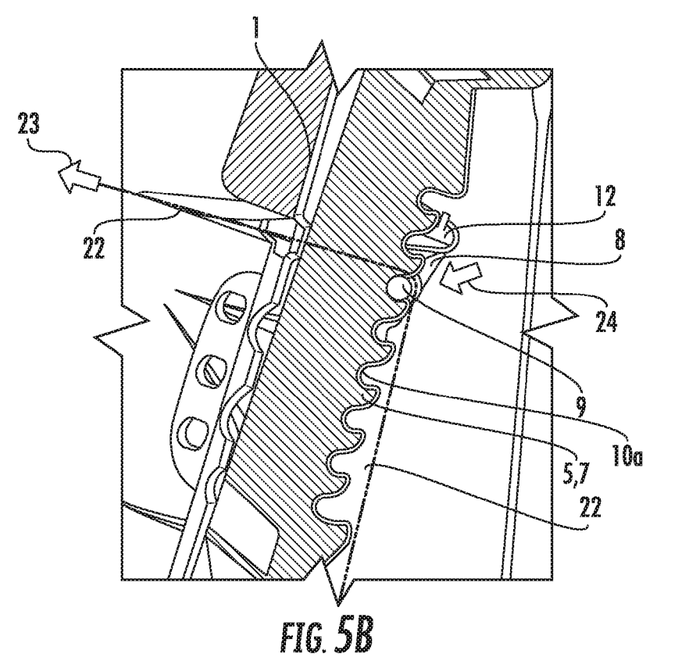
FIG. 5b is another detailed view of the same adjusting mechanism.

FIG. 5b is similar to FIG. 5a but shows in addition a strap of a harness 22. This harness strap 22 may be a shoulder belt of the internal harness system of a child safety seat in accordance with the invention. The harness strap 22 is routed over the axle 9. When a force is exerted on the harness strap 22 in the direction of arrow 23 (e.g. in the course of an accident), the axle 9 will receive a force acting in the direction of arrow 24. This force will press the axle 9 further into the recess 10a, thus safely locking the headrest 1 in the selected position.

LIST OF REFERENCE NUMERALS 1 headrest
2 seat shell 3 actuator
4 locking device
5 first component of locking device 4
6 second component of locking device 4
7 toothed rack
8 locking lever
9 axle
10 teeth of toothed rack 7
10a recess
11 biasing member/tension spring
12 pin
13 cover
14 screws
15 direction of downward movement of headrest 1
15a force on axle 9
16 direction of pushing actuator 3 downwards
17 release direction of locking lever 8
18 engagement direction of locking lever 8
19 direction of upward movement of headrest 1
20 direction of pulling actuator 3 upwards
22 harness strap
23 pulling force on harness strap
24 force on axle 9

The invention claimed is:

1. A child safety seat comprising:
a seat shell;
a headrest, wherein the headrest is slidably mounted to the seat shell for up-and-down movement;
an adjusting mechanism for the height adjustable headrest of the child safety seat, the adjusting mechanism comprising an actuator and a locking device,
wherein the locking device is configured to releasably lock the headrest at a selected height,
wherein the actuator is configured to allow the locking device to be released by actuation of the actuator, thus allowing the height of the headrest to be adjusted,
wherein the actuator is positioned between the headrest and the seat shell and is configured to project above the headrest,
wherein the locking device comprises a first component mounted to the seat shell and a second component mounted to the headrest,
wherein the second component is configured to releasably engage with the first component,
wherein the first component comprises a toothed rack and the second component comprises a locking lever and an axle,
wherein the locking lever is pivotally mounted to the headrest and the axle is adapted to be disengaged from the toothed rack by pivoting of the locking lever in order to unlock the locking device, and
wherein the teeth of the toothed rack are shaped to allow the axle to automatically snap from one position to another position when the actuator or the headrest is being pulled upwards.

2. The child safety seat of claim 1, wherein the first component is formed integrally with the seat shell.

3. The child safety seat of claim 1, wherein the actuator is coupled to the locking lever such that by pushing the actuator downwards the locking lever is configured to pivot in order to disengage the axle from the toothed rack.

4. The child safety seat of any claim 1, wherein the adjusting mechanism further comprises a biasing member configured to bias the axle into engagement with the toothed rack.

5. The child safety seat of claim 1, wherein the toothed rack is shaped so that the axle is prevented from being forced out of a recess positioned between two adjacent teeth of the toothed rack by pushing the headrest downwards, whereas the axle is free to slide out of the recess when the headrest is being pulled upwards.

6. The child safety seat of claim 1, further comprising an internal harness system comprising shoulder straps, wherein the shoulder straps are routed over the axle.

* * * * *